(12) United States Patent
Roy et al.

(10) Patent No.: US 12,350,611 B2
(45) Date of Patent: *Jul. 8, 2025

(54) TORSIONAL NO FILTER NO RUN SYSTEM

(71) Applicant: Cummins Filtration IP, Inc., Columbus, IN (US)

(72) Inventors: Ranjeet Roy, Pune (IN); Ken Tofsland, Stoughton, WI (US); Loick Menez, Columbus, IN (US); Ismail C. Bagci, Cookeville, TN (US); Charles W. Hawkins, Sparta, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 472 days.

This patent is subject to a terminal disclaimer.

(21) Appl. No.: 17/734,312

(22) Filed: May 2, 2022

(65) Prior Publication Data

US 2022/0258082 A1     Aug. 18, 2022

Related U.S. Application Data

(62) Division of application No. 16/076,989, filed as application No. PCT/US2017/019622 on Feb. 27, 2017, now Pat. No. 11,331,606.

(Continued)

(51) Int. Cl.
| | | |
|---|---|---|
| *B01D 27/10* | (2006.01) | |
| *B01D 29/21* | (2006.01) | |
| *B01D 35/147* | (2006.01) | |
| *B01D 35/153* | (2006.01) | |
| *B01D 35/30* | (2006.01) | |
| *F16K 1/02* | (2006.01) | |
| *F16K 1/04* | (2006.01) | |
| *F16K 1/08* | (2006.01) | |
| *F16K 1/10* | (2006.01) | |
| *F16K 3/26* | (2006.01) | |
| *F16K 31/50* | (2006.01) | |
| *B01D 35/00* | (2006.01) | |
| *B01D 46/00* | (2022.01) | |

(Continued)

(52) U.S. Cl.
CPC ........... *B01D 35/153* (2013.01); *B01D 27/10* (2013.01); *B01D 27/103* (2013.01); *B01D 27/106* (2013.01); *B01D 35/147* (2013.01); *B01D 29/21* (2013.01); *B01D 35/005* (2013.01); *B01D 35/30* (2013.01); *B01D 46/0087* (2013.01); *B01D 46/2414* (2013.01); *B01D 46/4272* (2013.01); *B01D 2201/16* (2013.01); *B01D 2201/167* (2013.01); *B01D 2201/291* (2013.01); *B01D 2201/295* (2013.01); *B01D 2201/301* (2013.01); *B01D 2201/302* (2013.01); *B01D 2201/304* (2013.01); *B01D 2201/306* (2013.01); *B01D 2201/347* (2013.01); *B01D 2201/40* (2013.01); *B01D 2201/4046* (2013.01); *B01D 2201/4053* (2013.01); *B01D 2201/4061* (2013.01); *B01D 2201/4092* (2013.01); *F16K 1/02* (2013.01); *F16K 1/04* (2013.01); *F16K 1/08* (2013.01); *F16K 1/10* (2013.01); *F16K 3/26* (2013.01); *F16K 31/50* (2013.01); *F16K 31/504* (2013.01)

(58) Field of Classification Search
CPC .... B01D 27/10; B01D 27/103; B01D 27/106; B01D 29/21; B01D 35/005; B01D 35/147; B01D 35/153; B01D 35/30; B01D 36/005; B01D 46/0087; B01D 46/2414; B01D 46/4272; B01D 2201/16; B01D 2201/167; B01D 2201/291; B01D 2201/295; B01D 2201/301; B01D 2201/302; B01D 2201/304; B01D 2201/306; B01D 2201/347; B01D 2201/4046; B01D 2201/4053; B01D 2201/4061; B01D 2201/4092; B01D 2201/40; F16K 1/02; F16K 1/12–1/28; F16K 31/50; F16K 1/04; F16K 1/08; F16K 1/10; F16K 3/26; F16K 31/504
See application file for complete search history.

(56) References Cited

U.S. PATENT DOCUMENTS

| | | |
|---|---|---|
| 6,723,239 B2 | 4/2004 | Maxwell |
| 8,002,981 B2 | 8/2011 | Bagci et al. |

(Continued)

FOREIGN PATENT DOCUMENTS

| | | |
|---|---|---|
| WO | WO-2017/155974 | 9/2017 |

OTHER PUBLICATIONS

International Search Report and Written Opinion issued for PCT/US2017/019622, issued May 18, 2017, 14 pages.

*Primary Examiner* — Ryan B Huang
*Assistant Examiner* — Tak L Chiu
(74) *Attorney, Agent, or Firm* — Foley & Lardner LLP

(57) ABSTRACT

A filtration system comprises a housing and a shell housing removably coupled to the housing. A valve comprise a valve housing and a plunger. The plunger comprises a seal member structured to seal an opening in the valve housing. The plunger is axially movable between a closed position, in which the seal member seals the opening, and an open position, in which the seal member does not seal the opening, thereby permitting fluid to flow through the valve housing. A filter element comprises filter media and an endcap. The endcap comprises an alignment tab configured to rotationally secure the filter element with respect to the shell housing when the shell housing is received in the housing. The endcap comprise a valve interaction projection structured to transfer rotation of the filter element and the shell housing to the plunger during installation of the filter element.

12 Claims, 10 Drawing Sheets

Related U.S. Application Data

(60) Provisional application No. 62/301,739, filed on Mar. 1, 2016.

(51) Int. Cl.
   *B01D 46/24* (2006.01)
   *B01D 46/42* (2006.01)

(56) References Cited

U.S. PATENT DOCUMENTS

| | | |
|---|---|---|
| 2005/0218059 A1 | 10/2005 | Knoll |
| 2006/0186031 A1 | 8/2006 | Fick et al. |
| 2008/0308481 A1 | 12/2008 | Wieczorek et al. |
| 2009/0090668 A1 | 4/2009 | Abdalla et al. |
| 2010/0181243 A1 | 7/2010 | Dworatzek et al. |
| 2010/0307966 A1 | 12/2010 | Fritze |
| 2011/0024344 A1* | 2/2011 | Thomas .............. B01D 29/21 |
| | | 210/232 |
| 2011/0203099 A1* | 8/2011 | Curt ................. B01D 29/96 |
| | | 210/232 |
| 2012/0031822 A1 | 2/2012 | Lepine et al. |
| 2013/0256207 A1 | 10/2013 | Greco et al. |
| 2014/0124459 A1 | 5/2014 | Li et al. |

* cited by examiner

TORSIONAL NO FILTER NO RUN SYSTEM

CROSS-REFERENCE TO RELATED APPLICATIONS

This application is a divisional of U.S. patent application Ser. No. 16/076,989, filed Aug. 9, 2018, which is a national stage of PCT Application No. PCT/US2016/019622, filed Feb. 27, 2017, which claims priority to U.S. Provisional Patent Application No. 62/301,739, entitled "TORSIONAL NO FILTER NO SYSTEM AND METHOD" filed Mar. 1, 2016. The contents of these applications are hereby incorporated by reference in their entirety and for all purposes.

TECHNICAL FIELD

The present application relates to filtration systems.

BACKGROUND

Internal combustion engines generally combust a mixture of fuel (e.g., gasoline, diesel, natural gas, etc.) and air. Prior to entering the engine, fluids, such as fuel and oil, are typically passed through filter elements to remove contaminants (e.g., particulates, dust, water, etc.) from the fluids prior to delivery to the engine. The filter elements require periodic replacement as the filter media of the filter elements captures and removes the contaminants from the fluids passing through the filter media. In some cases, unauthorized or non-genuine replacement filter elements may be installed in the filtration systems during servicing operations. The unauthorized and non-genuine replacement filter elements may be of inferior quality to genuine, authorized filter elements. Thus, the use of unauthorized or non-genuine replacement filter elements may cause damage to the engine by allowing contaminants past the filter element. Accordingly, some filtration systems include no filter no run ("NFNR") features that prevent the filtration systems from functioning properly if an unauthorized or non-genuine replacement filter element is installed in the filtration system. Improved NFNR features are desired.

SUMMARY

One example embodiment relates to a filtration system. The filtration system comprises a housing having a fluid inlet and a fluid outlet. The filtration system further comprises a shell housing removably coupled to the housing. The filtration system comprises a valve including a valve housing and a plunger. The plunger comprises a seal member structured to seal an opening in the valve housing. The plunger is axially movable between a closed position, in which the seal member seals the opening, and an open position, in which the seal member does not seal the opening, thereby permitting fluid to flow through the valve housing. The filtration system comprises a filter element having filter media and an endcap. The filter element is structured to be received in the shell housing. The endcap comprises an alignment tab configured to rotationally lock the filter element with respect to the shell housing when the shell housing is received in the housing. The endcap comprises a valve interaction projection structured to transfer rotation of the filter element and the shell housing to the plunger during installation of the filter element into the filtration system, thereby opening the valve when the filter element is installed in the filtration system.

Another example embodiment relates to a filter element. The filter element comprises filter media and an endcap. The endcap comprises an alignment tab configured to rotationally lock the filter element with respect to a shell housing during an installation of the filter element into the shell housing. The endcap comprises a valve interaction projection structured to transfer rotation of the filter element and the shell housing to a plunger of a no-filter no-run valve during installation of the filter element, thereby opening the no-filter no-run valve when the filter element is installed.

A further example embodiment relates to a no-filter no-run valve assembly. The valve assembly comprises a valve housing and a plunger. The valve housing has an opening such that fluid can flow through the valve housing. The plunger is coupled to the valve housing via a threaded connection. The plunger comprises a seal member structured to seal the opening in the valve housing. The plunger is axially movable with respect to the valve housing along the threaded connection through rotation of the plunger with respect to the valve housing. The plunger is axially movable between a closed position, in which the seal member seals the opening, and an open position, in which the seal member does not seal the opening, thereby permitting fluid to flow through the valve housing.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, filtration systems having a NFNR feature are described. The filtration systems include a moving plunger that is threadedly connected to a filtration system housing. The when the plunger is rotated, the plunger is axially movable between an open position, in which fluid is permitted to flow through the filtration system, and a closed position, in which fluid is prevented from flowing through the filtration system. In some arrangements, the moving plunger is biased by a spring towards the closed position. The plunger includes a groove that acts as a keyway. Authorized (i.e., genuine and approved) filter cartridges include a key that engages with the groove and rotationally locks the filter cartridge with respect to the plunger. Accordingly, when a genuine filter cartridge is installed into the filtration system by rotating the filter cartridge into an installed position, the filter cartridge rotates the plunger and axially moves the plunger from the closed position to the open position, thereby allowing fluid to flow through the filtration system 100.

Figure 1:
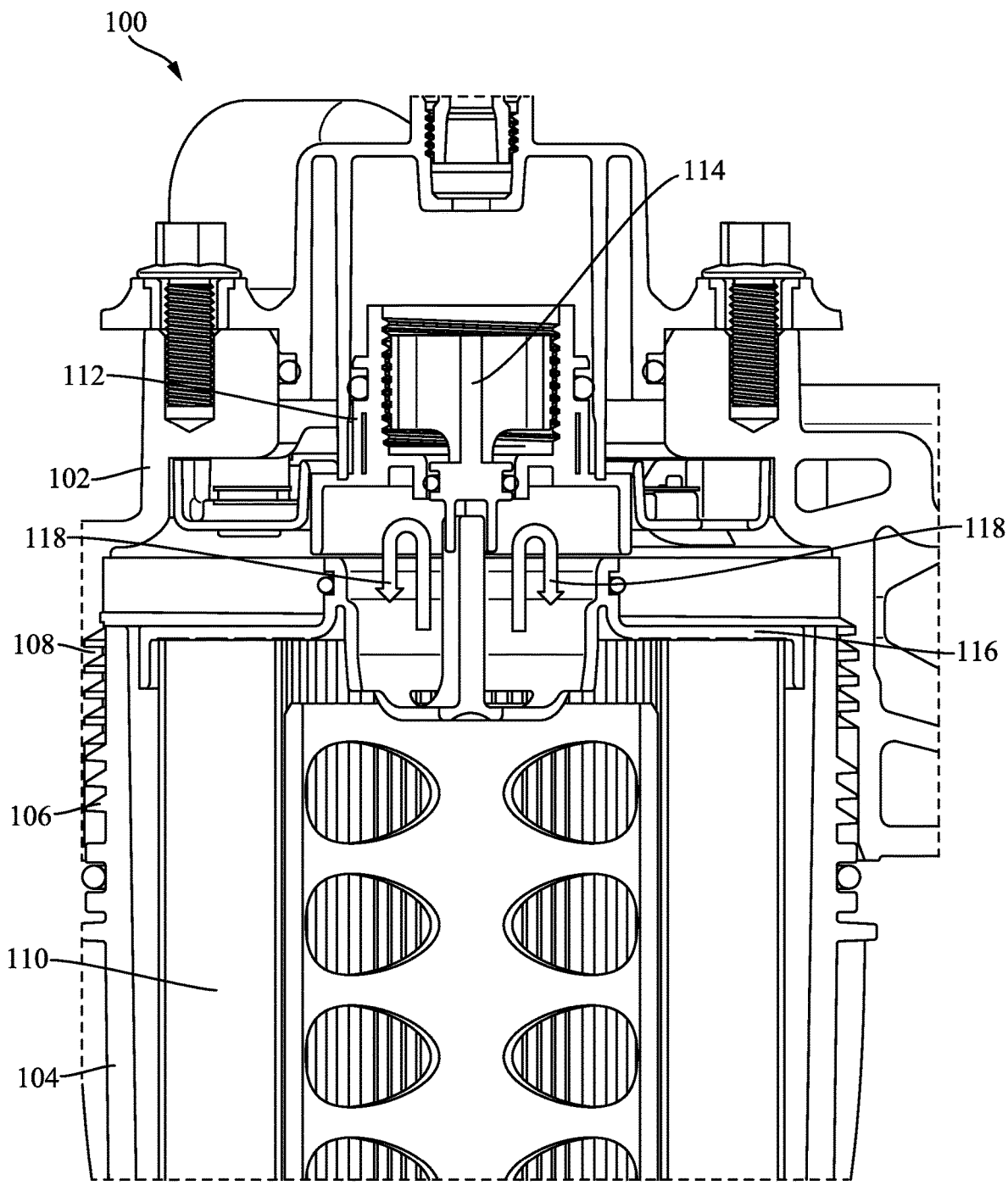
FIG. 1 and FIG. 2 each show different cross-sectional views of a filtration system according to an example embodiment.
Figure 2:
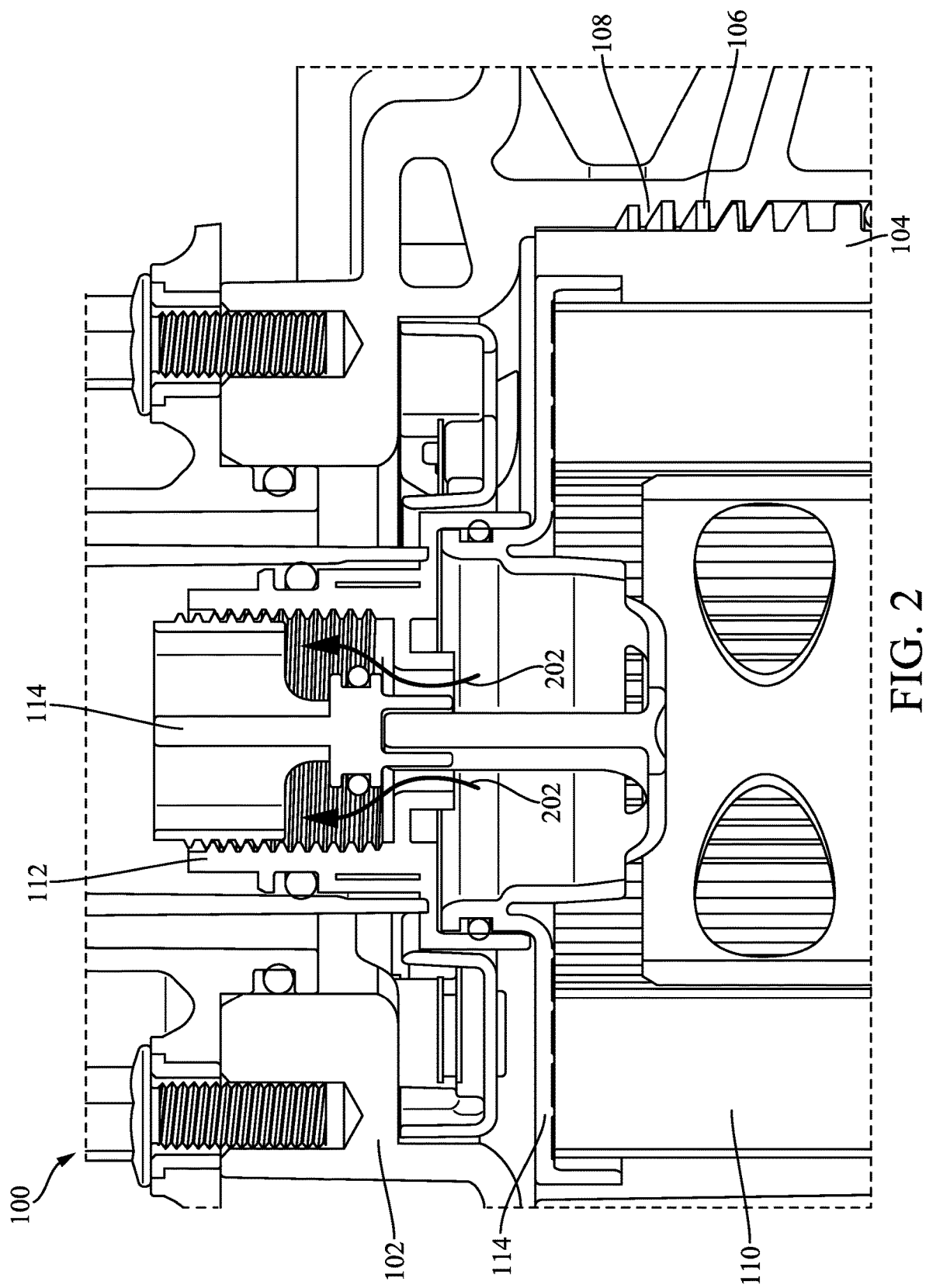

FIG. 1 shows a cross-sectional view of a filtration system 100 according to an example embodiment. FIG. 2 shows another cross-sectional view of the filtration system 100. As shown in FIG. 1, the filtration system 100 is a liquid (e.g., fuel, oil, water, etc.) filtration system. The filtration system 100 includes a filter housing 102 and a shell housing 104. In some arrangements, the shell housing 104 is cylindrical in shape (although other shapes are possible). The shell housing 104 is removably connected to the housing 102 via a threaded connection formed by first threads 106 on the shell housing 104 and second threads 108 on the housing 102. The filtration system includes a filter element 110. The filter element 110 is removably installed within the shell housing 104 such that when the shell housing 104 is installed onto (e.g., threaded onto) the housing 102, the filter element 110 is also installed in the filtration system (e.g., as shown in FIG. 2). Generally, fluid to be filtered flows into the shell housing, through the filter element 110 in an outside-in flow arrangement, and out the filter housing 102.

Figure 3:
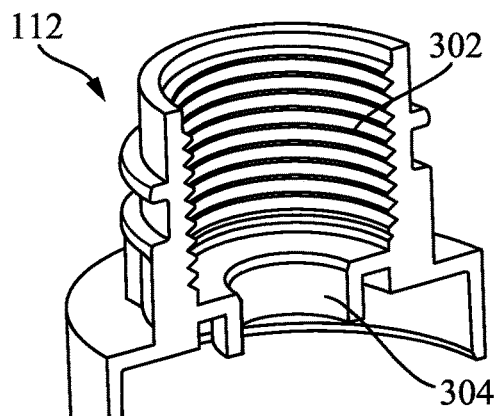
FIG. 3 shows a cross-sectional view of a valve housing of the filtration system of FIG. 1.

The filter housing 102 includes a valve that forms a NFNR feature of the filtration system 100. The valve is formed by a valve housing 112 and a plunger 114. In some arrangements, the valve housing 112 is integrally formed with the housing 102. In other arrangements, the valve housing 112 is coupled to the housing 102. A cross-sectional view of the valve housing 112 is shown in greater detail in FIG. 3. The valve housing 112 includes an internally threaded surface 302. In some arrangements, the axial advance per rotation (i.e., the lead) of the internally threaded surface 302 is the same as the lead of the first threads 106 and the second threads 108. The valve housing 112 includes a sealing surface 304.

Figure 4:
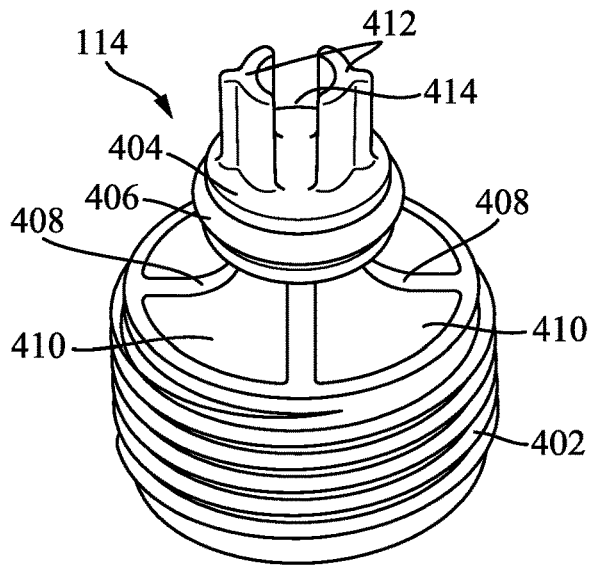
FIG. 4 and FIG. 5 each show a different perspective view of a plunger of the filtration system of FIG. 1.
Figure 5:
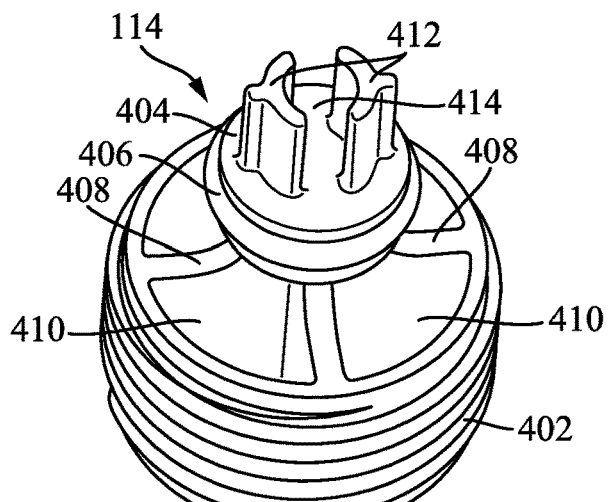

FIG. 4 and FIG. 5 each show perspective views of the plunger 114. The plunger includes an externally threaded cylinder 402. The externally threaded cylinder 402 is sized and shaped to mate with the internally threaded surface 302 of the valve housing 112. The plunger 114 includes a seal support member 404. The seal support member 404 supports a seal member 406. In some arrangements, the seal member 406 is an o-ring. The seal support member 404 is coupled to the externally threaded cylinder 402 through extension members 408. The extension members 408 define flow channels 410. As described in further detail below, the flow channels 410 allow filtered fluid to flow through the housing 102 and out of the filtration system 100 when the valve is in an open position. The plunger 114 includes a locking feature formed by two projections 412 extending axially from the seal support member 404. The projections 412 are spaced apart from each other to form a groove 414. As described in further detail below, the groove 414 forms a keyway.

Figure 6:
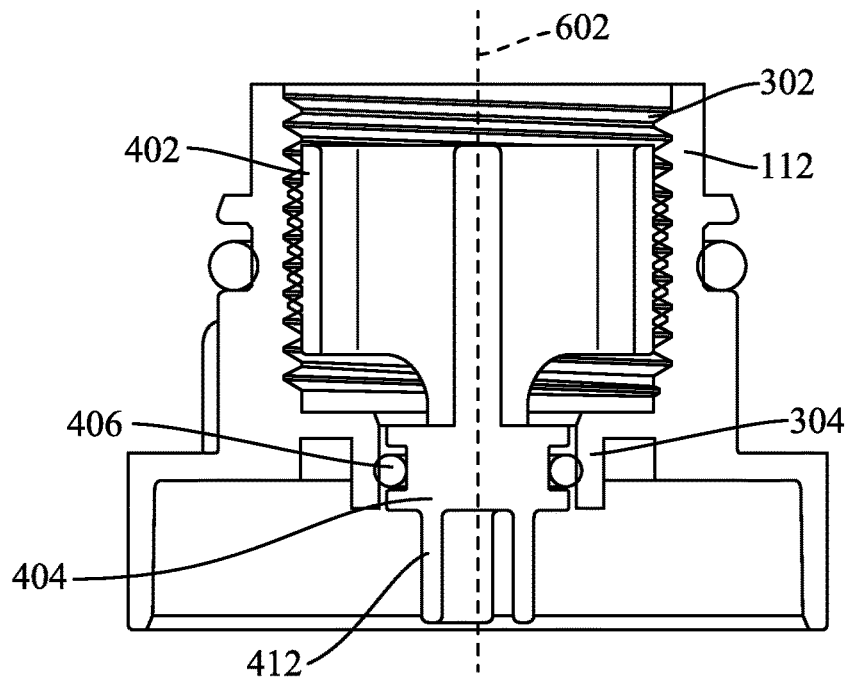
FIG. 6 shows a cross-sectional view of the assembled valve of the filtration system of FIG. 1.

Referring to FIG. 6, a cross-sectional view of the assembled valve of the filtration system 100 is shown. When the plunger 114 is installed into the valve housing 112, the threads of the internally threaded surface 302 mesh with the threads of the externally threaded cylinder 402. Accordingly, when the plunger 114 is rotated, the plunger 114 moves axially along a central axis 602 of the valve. When the valve is in the closed position, as shown in FIG. 6, the seal member 406 presses against the seal support member 404 and the sealing surface 304 to form a seal that prevents fluid from flowing through the valve (e.g., from flowing through the flow channels 410).

Figure 7:
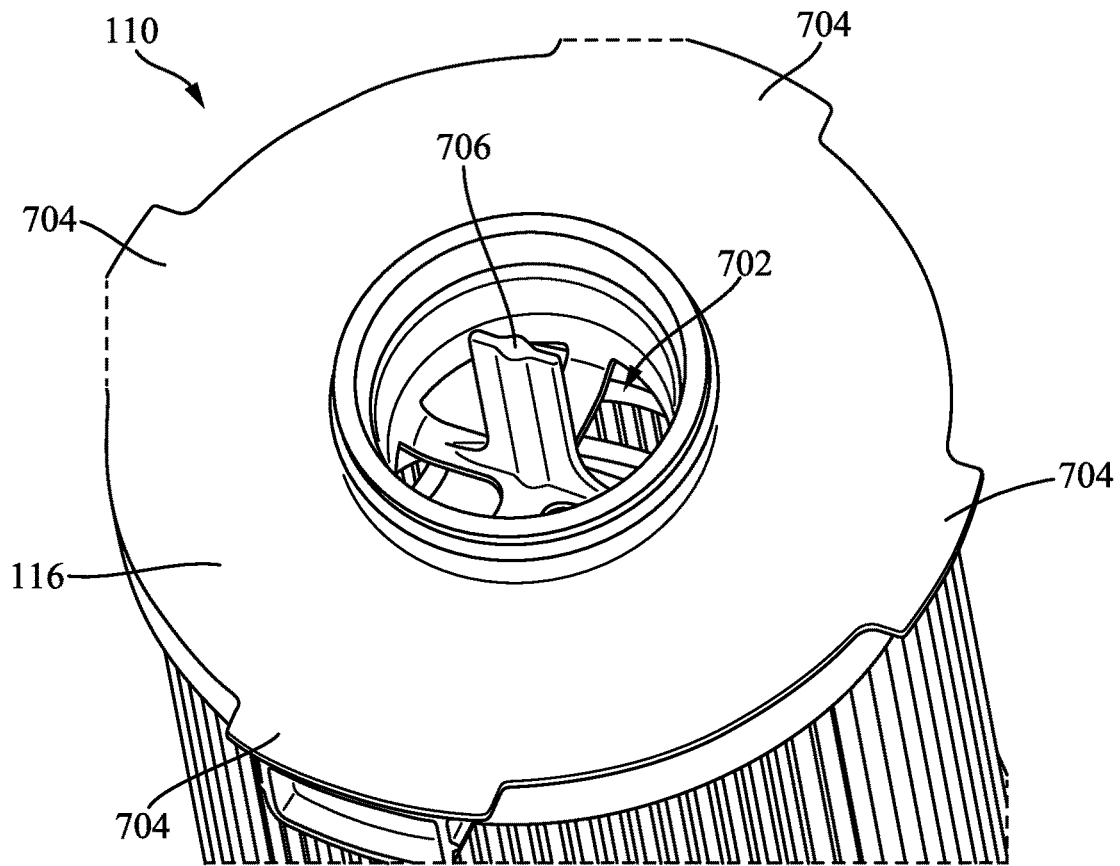
FIG. 7 shows a perspective view of the filter element and the endcap of the filtration system of FIG. 1.
Figure 8:
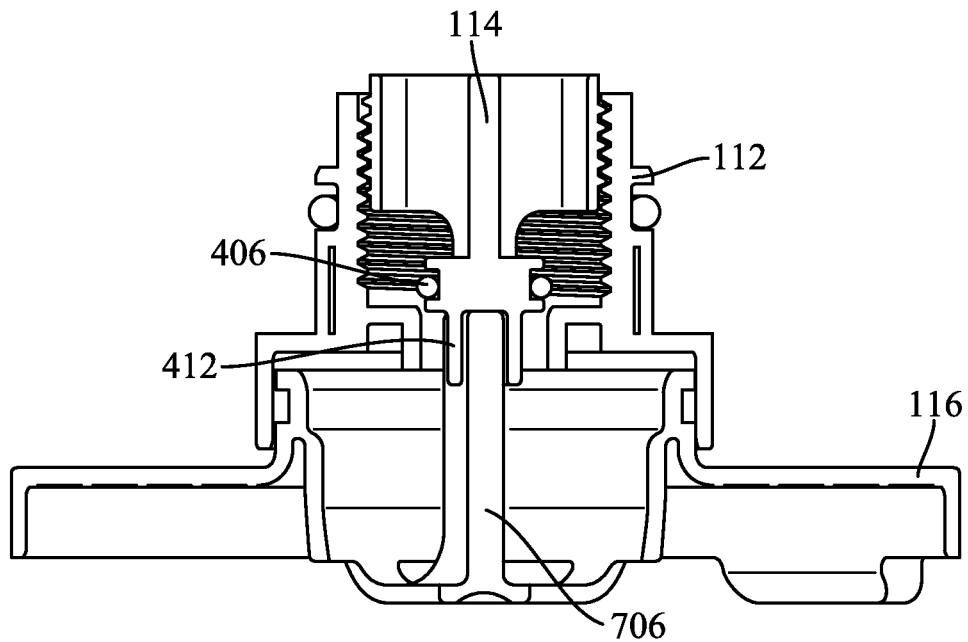
FIG. 8 and FIG. 9 each show different cross-sectional views of the interaction of a key and groove of the filtration system of FIG. 1.
Figure 9:
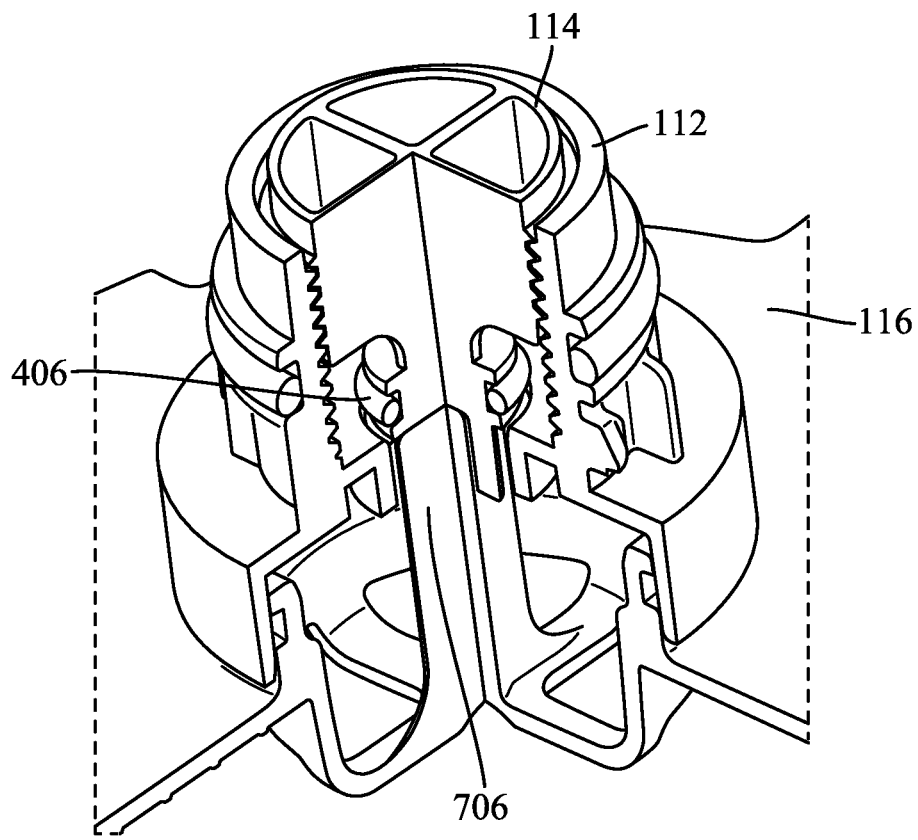

Referring again to FIGS. 1 and 2, the filter element 110 is an authorized filter element and is structured to interact with the valve. Accordingly, the filter element includes an endcap 116 structured to rotate the plunger 114. A perspective view of the filter element 110 and the endcap 116 is shown in FIG. 7. The endcap 116 is coupled to the filter media of the filter element 110. The endcap 116 includes a central opening 702 that allows filtered fluid to flow out of the filter element 110. The endcap 116 includes alignment tabs 704. The alignment tabs 704 are received in slots of the shell housing 104 and rotationally lock the filter element 110 with respect to the shell housing 104. Accordingly, when the shell housing 104 is installed by rotating the shell housing 104 into the housing 102, the filter element 110 rotates with the shell housing 104. The endcap 116 further includes a key 706 sized and shaped to be received in the groove 414 of the plunger 114 when the filter element 110 is being installed in the filtration system 100. The key 706 extends partially through the opening 702. FIG. 8 and FIG. 9 each show cross-sectional views of the key 706 being received within the groove 414. When the key 706 is received within the groove (e.g., when the filter element 110 is installed in the filtration system), as the filter element 110 rotates, the key 706 transfers the rotational motion to the plunger 114 thereby axially moving the plunger 114 within the valve housing 112.

As shown in FIG. 1, the filter element 110 is partially installed in the filtration system 100. The shell housing 104 is not connected to the housing 102. When the filter element 110 is not installed in the filtration system 100, the valve is in the closed position. In some arrangements, the valve is biased into the closed position by a spring that biases the plunger 114 into the position shown in FIG. 1. When the valve is in the closed position, the seal member 406 is pressing against the sealing surface 304 forming a seal between the plunger 114 and the valve housing 112. When the valve is in the closed position, fluid is prevented from passing through the valve as shown by arrows 118. The cross-sectional view presented in FIG. 6 also shows the valve in the closed position. When the filter element 110 is partially installed in the filtration system, the key 706 engages and partially extends into the groove 414 of the plunger 114.

FIG. 2 shows the filter element 110 fully installed in the filtration system 100. To shift from the uninstalled position of FIG. 1 to the installed position of FIG. 2, the shell housing 104 with the filter element 110 is rotated into place in the filtration system 100. During rotation of the shell housing 104, the filter element 110 and the endcap 116 are also rotated. The key 706 transfers the rotation of the shell housing 104 and the filter element 110 to the plunger 114. Accordingly, as the shell housing 104 is rotated by a technician installing the filter element 110, the plunger 114 is also rotated. As the plunger 114 rotates, the plunger 114 moves axially (e.g., along the axis 602 of FIG. 6) such that the seal member 406 is lifted out of and away from the sealing surface 304 of the valve housing 112. When the filter element 110 is fully installed (as shown in FIG. 2), the valve is in the open position, and fluid can pass through the valve as shown by arrows 202. The cross-sectional views presented in FIGS. 8 and 9 also show the valve in the closed position.

Figure 10:
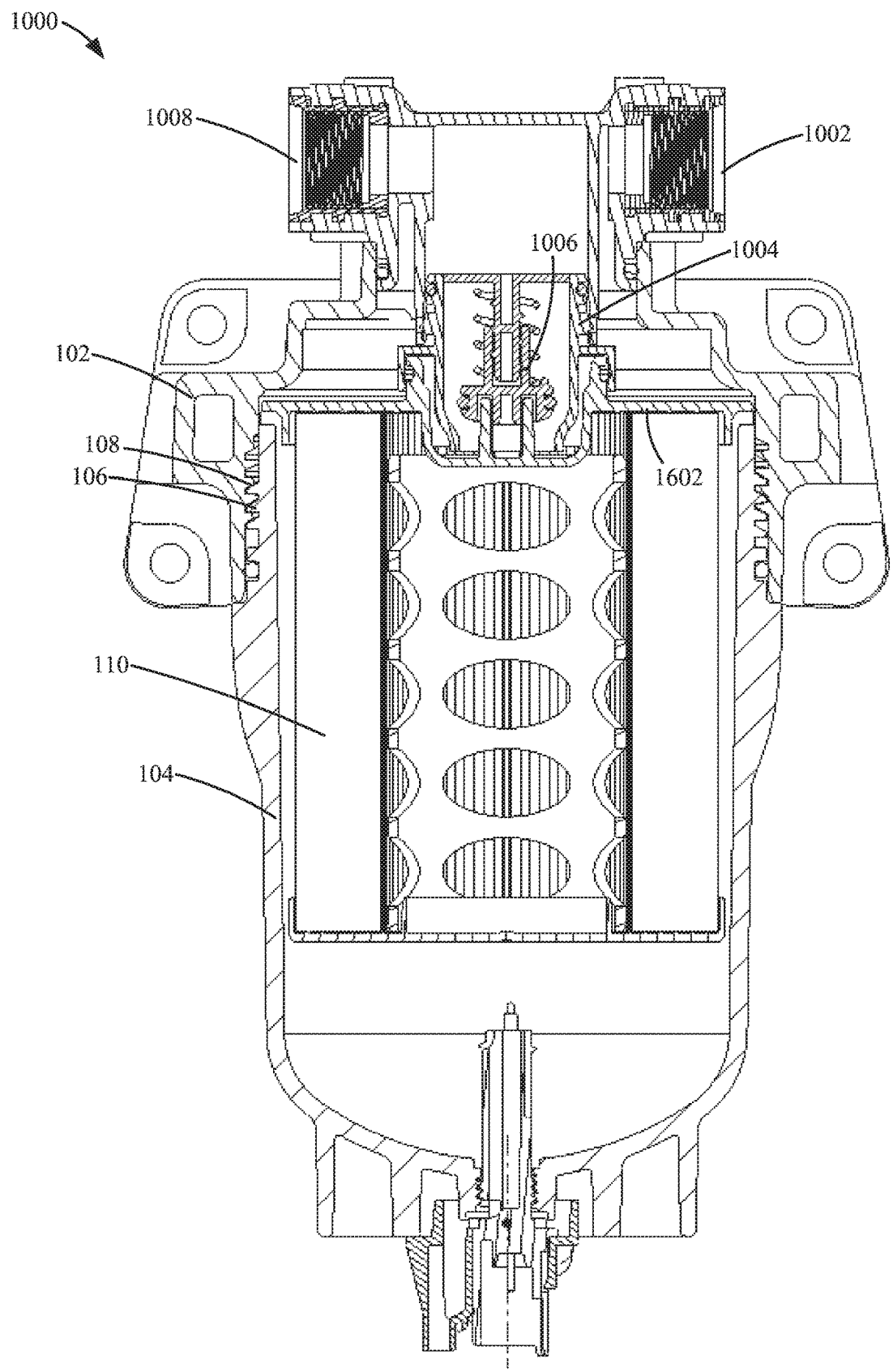
FIG. 10 and FIG. 11 each show different cross-sectional views of a filtration system according to another example embodiment.
Figure 11:
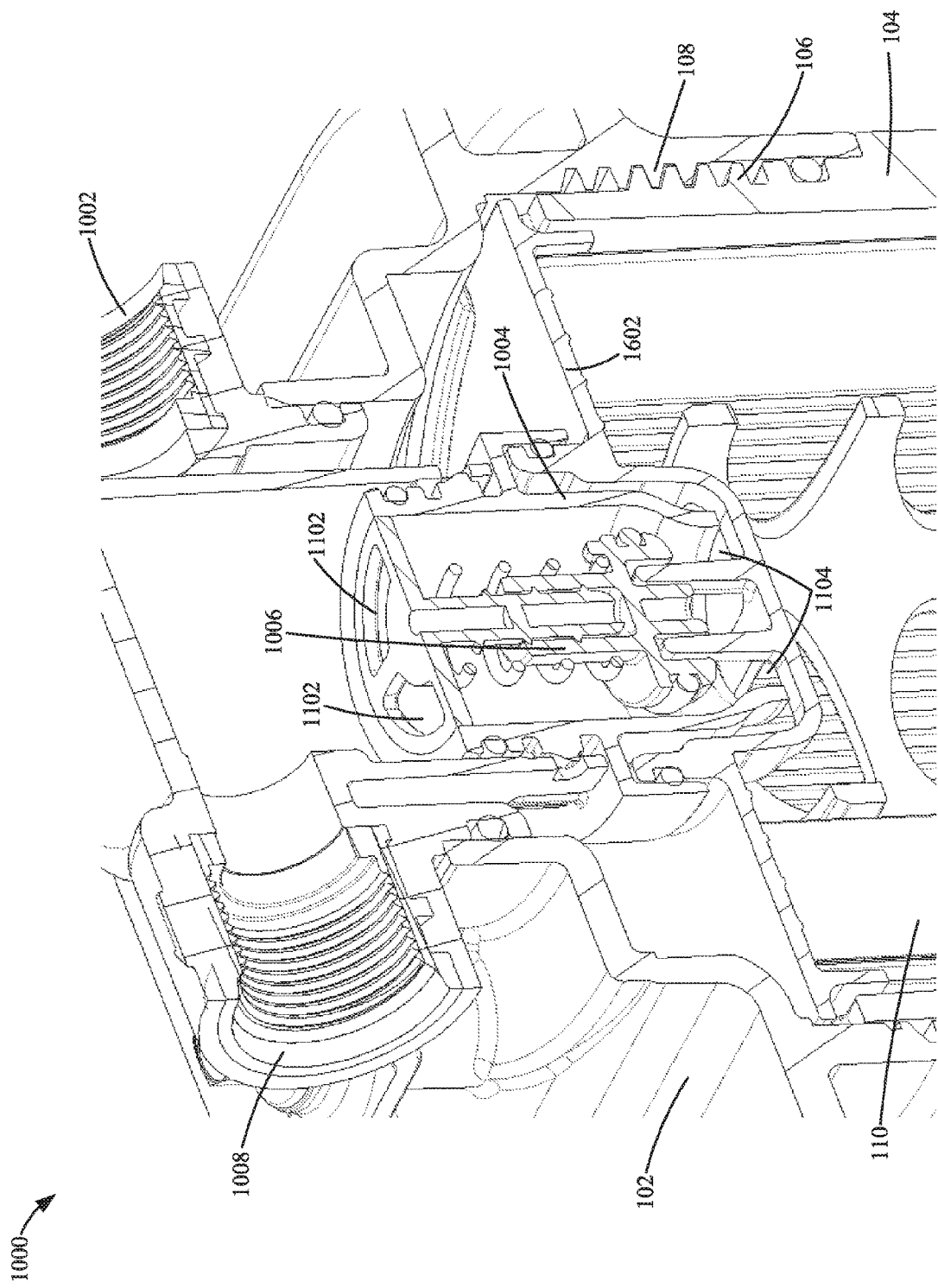
Figure 17:
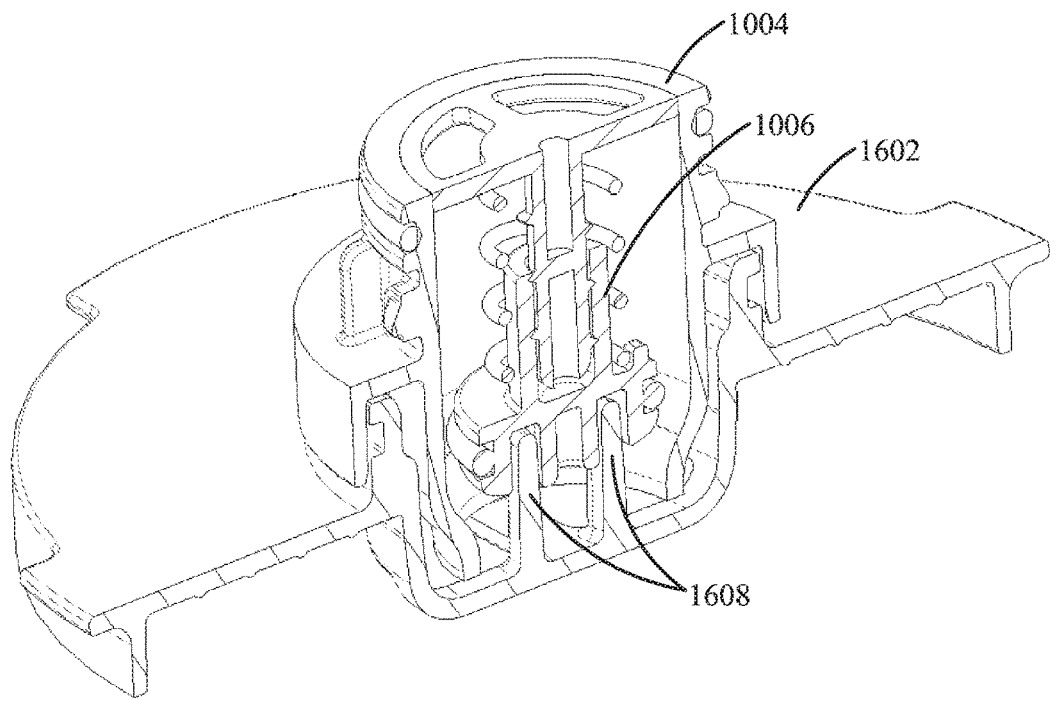
FIG. 17 shows a cross-sectional view of the valve interaction pins of the endcap of FIG. 16 engaging the grooves the plunger of FIG. 14.

Referring to FIG. 10, a cross-sectional view of a filtration system 1000 is shown according to an example embodiment. FIG. 11 shows another cross-sectional view of the filtration system 1000. The filtration system 1000 is similar to the filtration system 100. The primary difference between the filtration system 1000 and the filtration system 100 is the arrangement of the valve that forms the NFNR feature of the filtration system 1000. Accordingly, like numbering is used to designate like parts between the filtration system 1000 and the filtration system 100. The filtration system 1000 is a liquid (e.g., fuel, oil, water, etc.) filtration system. The filtration system 1000 includes a filter housing 102 and a shell housing 104. In some arrangements, the shell housing 104 is cylindrical in shape. The shell housing 104 is removably connected to the housing 102 via a threaded connection formed by first threads 106 on the shell housing 104 and second threads 108 on the housing 102. The filtration system includes a filter element 110. The filter element 110 is removably installed within the shell housing 104 such that when the shell housing 104 is installed on to (e.g., threaded on to) the housing 102, the filter element 110 is also installed in the filtration system 1000. FIGS. 10 and 11 both show the filter element 110 in the installed position within the filtration system 100. Generally, fluid to be filtered flows into the housing 102 via an inlet 1002, through the filter element 110 in an outside-in flow arrangement, through a valve formed by a valve housing 1004 and a plunger 1006, and out the filter housing 102 through an outlet 1008. As described in further detail below, when the filter element 110 is installed in the filtration system 1000, valve interaction pins 1608 of the endplate 1602 interact with the plunger 1006 to open the valve (as shown in FIG. 17).

Figure 12:
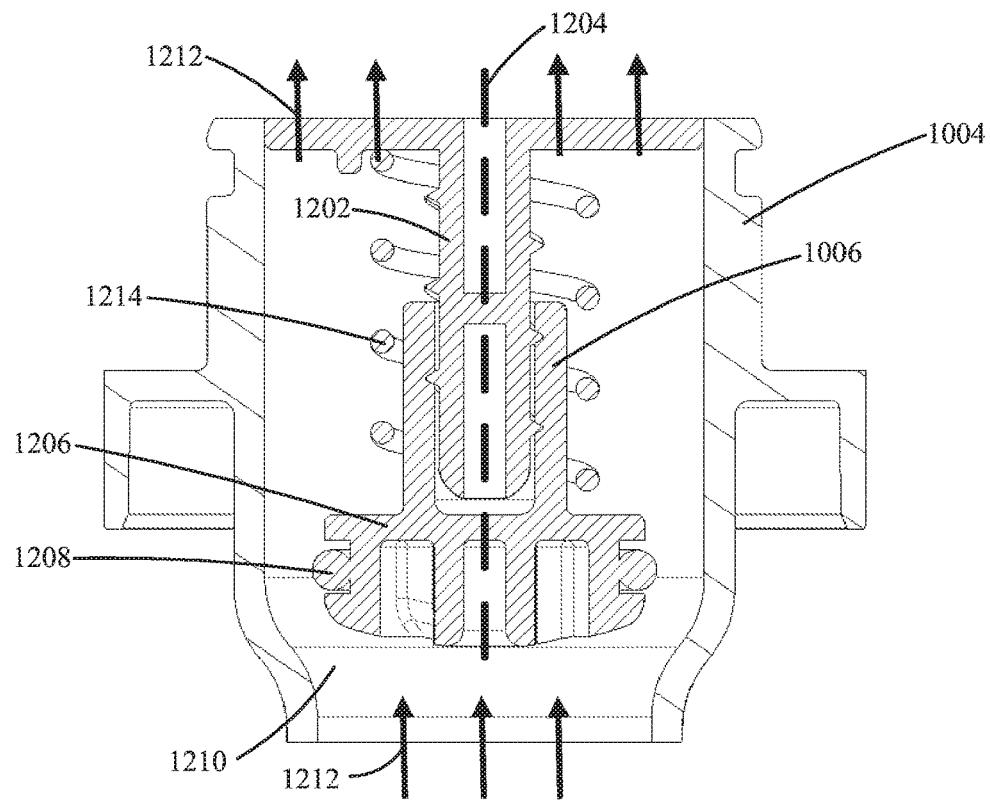
FIG. 12 is a cross-sectional view of the valve of the filtration system of FIG. 10 in the open position.
Figure 13:
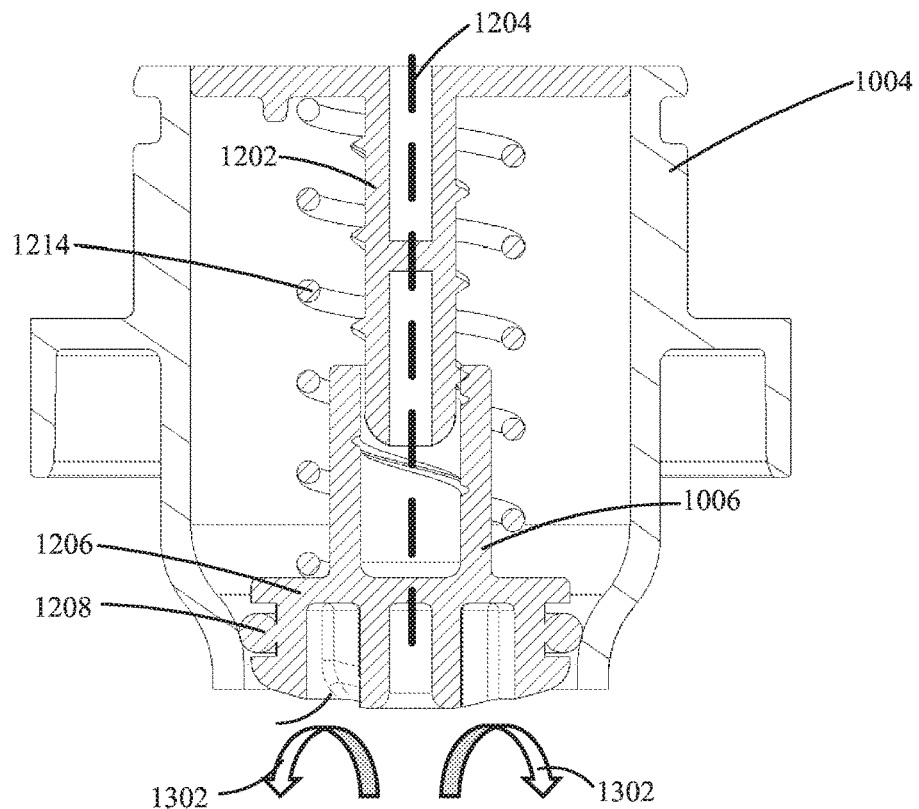
FIG. 13 is a cross-sectional view of the valve of the filtration system of FIG. 10 in the closed position.

Referring to FIG. 12, a cross-sectional view of the valve of the filtration system 1000 in the open position is shown. Referring to FIG. 13, a cross-sectional view of the valve of the filtration system 1000 in the closed position is shown. The valve of the filtration system 1000 includes the valve housing 1004 and the plunger 1006. The valve housing 1004 includes first flow openings 1102 and second flow openings 1104 (as shown in FIG. 11) that allow fluid to flow through the valve housing 1004 when the valve is open. The plunger 1006 is threadedly received on a connection shaft 1202 of the valve housing 1004. Accordingly, as the plunger 1006 is rotated with respect to the valve housing 1004, the plunger 1004 moves axially along the central axis 1204. The plunger 106 includes a seal support member 1206. The seal support member 1206 supports a seal member 1208. In some arrangements, the seal member 1208 is an o-ring. As shown in FIG. 13, when the valve is in the closed position, the plunger 1006 presses the seal member 1208 against a sealing surface 1210 of the valve housing 1004 to form a seal that prevents fluid from flowing through the valve (e.g., as designated by arrows 1302). When the valve is in the open position (e.g., as shown in FIG. 12), the plunger 1006 is lifted away from the sealing surface 1210 thereby breaking the seal between the seal member 1208 and the sealing surface 1210, which fluid to flowing through the valve (e.g., as designated by arrows 1212). A spring 1214 biases the plunger 1006 into the closed position.

Figure 14:
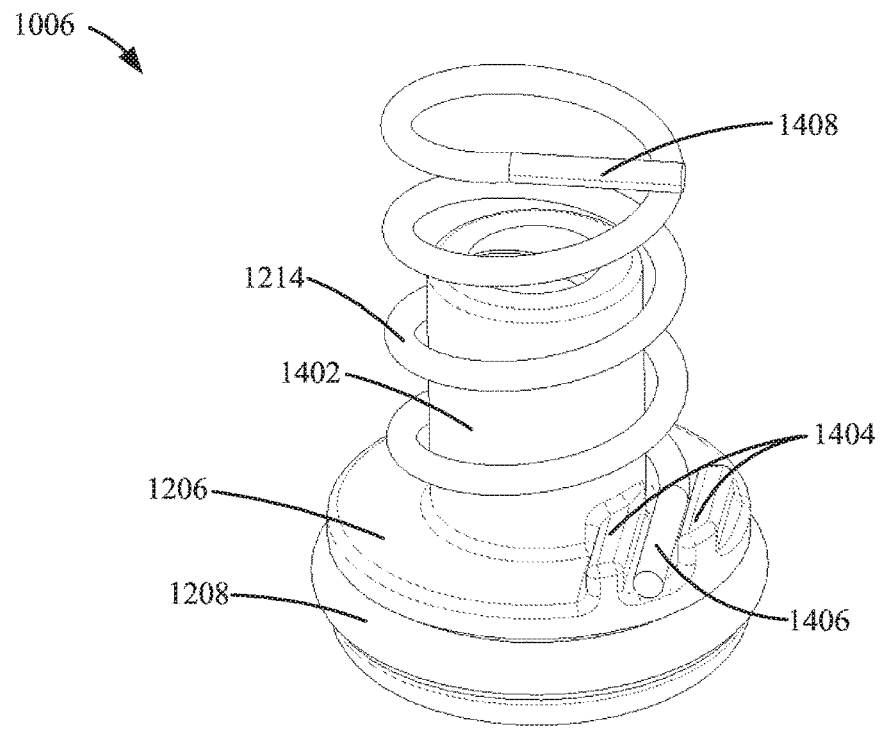
FIG. 14 and FIG. 15 each show detailed perspective views of the plunger of the filtration system of FIG. 10.
Figure 15:
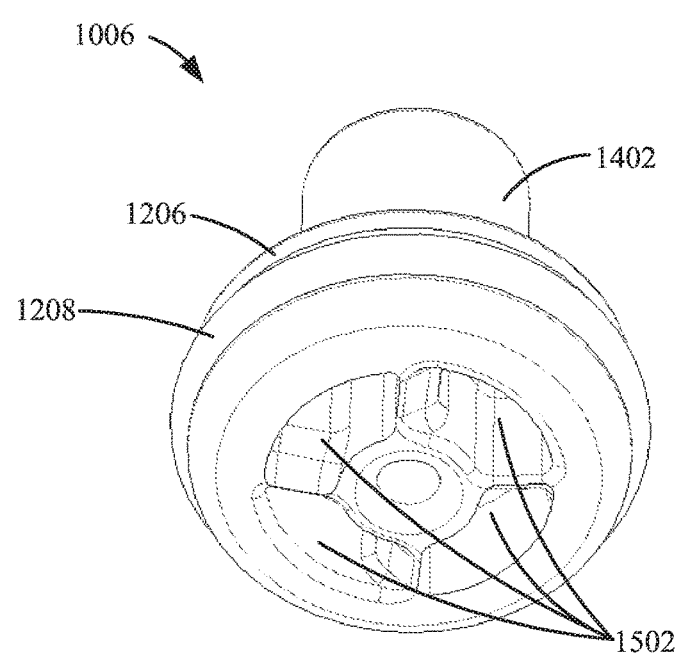

FIGS. 14 and 15 each show detailed perspective views of the plunger 1006. The plunger 1006 is generally formed by a central shaft 1402 and the seal support member 1206. The central shaft 1402 is hollow and threaded (e.g., as shown in FIGS. 12 and 13). The central shaft 1402 and the seal support member 1206 have a substantially T-shaped cross-section (e.g., as shown in FIGS. 12 and 13). The seal support member 1206 includes a spring clip 1404 that rotationally fixes a first free end 1406 of the spring 1214 to the plunger 1006. The second free end 1408 of the spring 1214 is coupled to and rotationally fixed to the valve housing 1004. Accordingly, as the plunger 1006 rotates, the spring 1214 coils or uncoils. The seal support member 1206 includes a plurality of grooves 1502 positioned on a surface opposite the spring clip 1404. As described in further detail below, the grooves 1502 receive the valve interaction pins 1608 of the endcap 1602 of the filter element 110. During installation of the filter element 110 into the filtration system 1000, the valve interaction pins 1608 of the endcap 1602 transfer rotation from the filter element 110 to the plunger 1006 thereby opening the valve. In some arrangements, the grooves 1502 are chamfered to facilitate alignment and insertion of the valve interaction pins 1608 into the grooves 1502.

Figure 16:
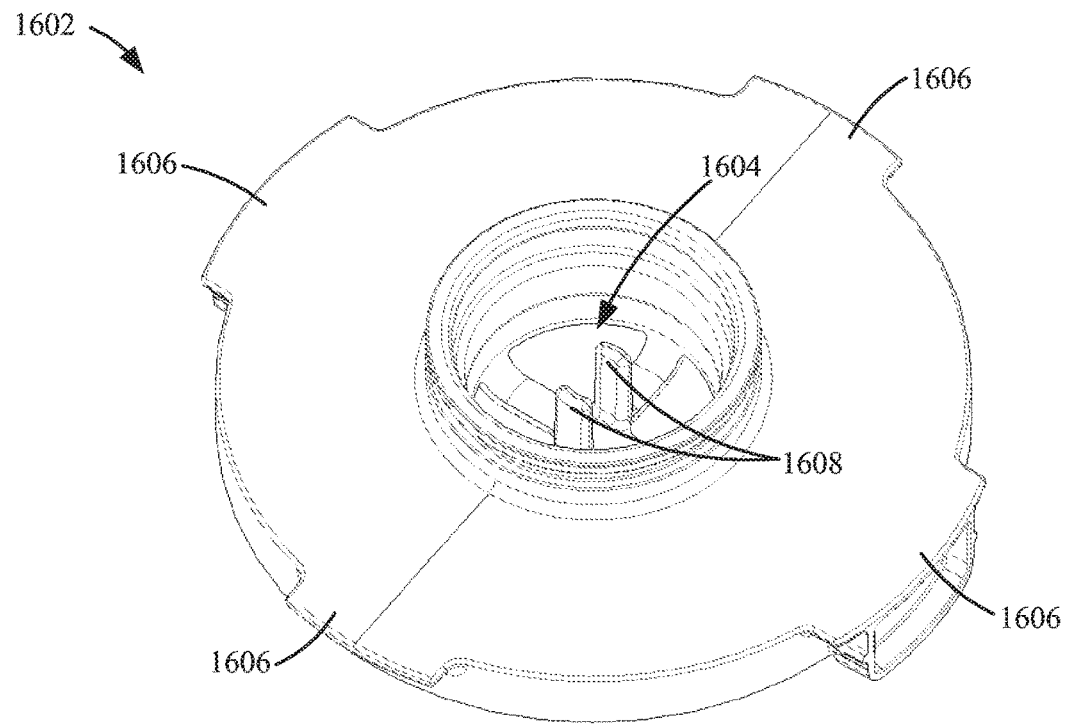
FIG. 16 is a perspective view of the endcap of the filter element installed in the filtration system of FIG. 10.

Referring to FIG. 16, a perspective view of an endcap 1602 of the filter element 110 is shown according to an example embodiment. The endcap 1602 is similar to the endcap 116. The endcap 1602 is coupled to the filter media of the filter element 110 (e.g., as shown in FIGS. 10 and 11). The endcap 1602 includes a central opening 1604 that allows filtered fluid to flow out of the filter element 110. The endcap 1602 includes alignment tabs 1606. The alignment tabs 1606 are received in slots of the shell housing 104 and rotationally lock the filter element 110 with respect to the shell housing 104. Accordingly, when the shell housing 104 is installed by rotating the shell housing 104 into the housing 102, the filter element 110 rotates with the shell housing 104. The endcap 1602 further includes the valve interaction pins 1608 sized and shaped to be received in the grooves 1502 of the plunger 1006 when the filter element 110 is being installed in the filtration system 1000. The valve interaction pins 1608 extend partially through the opening 1604. FIG. 17 shows a cross-sectional view of the valve interaction pins 1608 engaging the grooves 1502 of the plunger 1006.

Referring to FIG. 17, a close-up cross-sectional view of the endcap 1602 engaging the valve of the filtration system 1000 is shown. As shown in FIGS. 10, 11, and 17, during installation of the filter element 110 into the filtration system 1000, the valve interaction pins 1608 enter the grooves 1502 of the plunger 1006. As the shell housing 104 is spun onto the housing 102, the valve interaction pins 1608 transfer the rotation of the filter element 110 to the plunger 1006. As the plunger 1006 rotates, the plunger 1006 is axially displaced along the central axis 1204 from the closed position (of FIG. 13) to the open position (of FIG. 12). When the filter element 110 is being removed from the filtration system 1000, the shell housing 104 is spun off of the housing 102, which rotates the filter element 110. Accordingly, during removal of the filter element 110, the valve interaction pins 1608 rotate the plunger 1006 in the opposite manner as during installation, and the plunger 1006 rotates causing the plunger 1006 to be axially displaced along the central axis 1204 from the open position (of FIG. 12) to the closed position (of FIG. 13). During removal of the filter element 110 from the filtration system, the spring 1214 assists with shifting the valve from the open position to the closed position.

In each of the above-described filtration systems, the valve (e.g., the valve formed by the valve housing 112 and the plunger 114 of the filtration system 100, or the valve formed by the valve housing 1004 and the plunger 1006 of the filtration system 1000) form a NFNR feature. If an unauthorized filter element (e.g., a filter element lacking the key 706 is installed in the filtration system 100, a filter element lacking the valve interaction pins 1608 installed in the filtration system 1000) is installed in either of the filtration system 100 or the filtration system 1000, the respective valve will remain in the closed position. Accordingly, if an unauthorized filter element is installed, fluid will not flow through either filtration system 100 or filtration system 1000. Additionally, unlike NFNR features that rely on a floating component (e.g., a floating ball), the NFNR features of the filtration systems 100 and 1000 cannot be circumvented by merely pushing a component. Rather, due to the threaded connection between the plunger 114 and the valve housing 112 and the threaded connection between the plunger 1006 and the valve housing 1004, the plungers 114 and 1006 must be rotated at the correct rate of rotation with respect to the installed filter element from the closed position to the open position, not merely pushed.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:
   filter media; and
   an endcap comprising an alignment tab configured to rotationally secure the filter element with respect to a shell housing during an installation of the filter element into the shell housing, the endcap comprising at least one valve interaction projection structured to transfer rotation of the filter element and the shell housing to a plunger of a no-filter no-run valve during installation of the filter element, thereby opening the no-filter no-run valve when the filter element is installed.

2. The filter element of claim 1, wherein the at least one valve interaction projection comprises a plurality of valve interaction projections.

3. The filter element of claim 1, wherein the endcap defines a central opening configured to allow filtered fluid to flow out of the filter element.

4. The filter element of claim 3, wherein the at least one valve interaction projection extends at least partially through the central opening.

5. The filter element of claim 1, wherein the endcap comprises a base extending radially over an entire axial end of the filter media, and wherein the alignment tab extends radially outwardly from an outer edge of the base.

6. The filter element of claim 1, wherein the alignment tab is one of a plurality of alignment tabs.

7. The filter element of claim 6, wherein the endcap comprises a base extending radially over an entire axial end of the filter media, and wherein the plurality of alignment tabs extend radially outwardly from an outer edge of the base.

8. The filter element of claim 6, wherein the plurality of alignment tabs comprise four alignment tabs.

9. The filter element of claim 1, wherein the at least one valve interaction projection extends along a longitudinal axis of the filter media.

10. The filter element of claim 1, wherein the at least one valve interaction projection is at least partially radially surrounded by the filter media.

11. The filter element of claim 1, wherein:
    the endcap defines a central opening configured to allow filtered fluid to flow out of the filter element;
    the endcap further comprises at least one lateral portion extending laterally into the central opening; and
    the at least one valve interaction projection extends axially from the at least one lateral portion.

12. The filter element of claim 11, wherein the endcap is a first endcap coupled to a first axial end of the filter media, and further comprising a second endcap coupled to a second axial end of the filter media opposite the first axial end of the filter media, the at least one valve interaction projection extending in a direction axially away from the second endcap.

* * * * *